March 3, 1942. J. C. TRAVILLA, JR., ET AL 2,274,757
LOCOMOTIVE TENDER
Filed Feb. 21, 1938 7 Sheets-Sheet 2
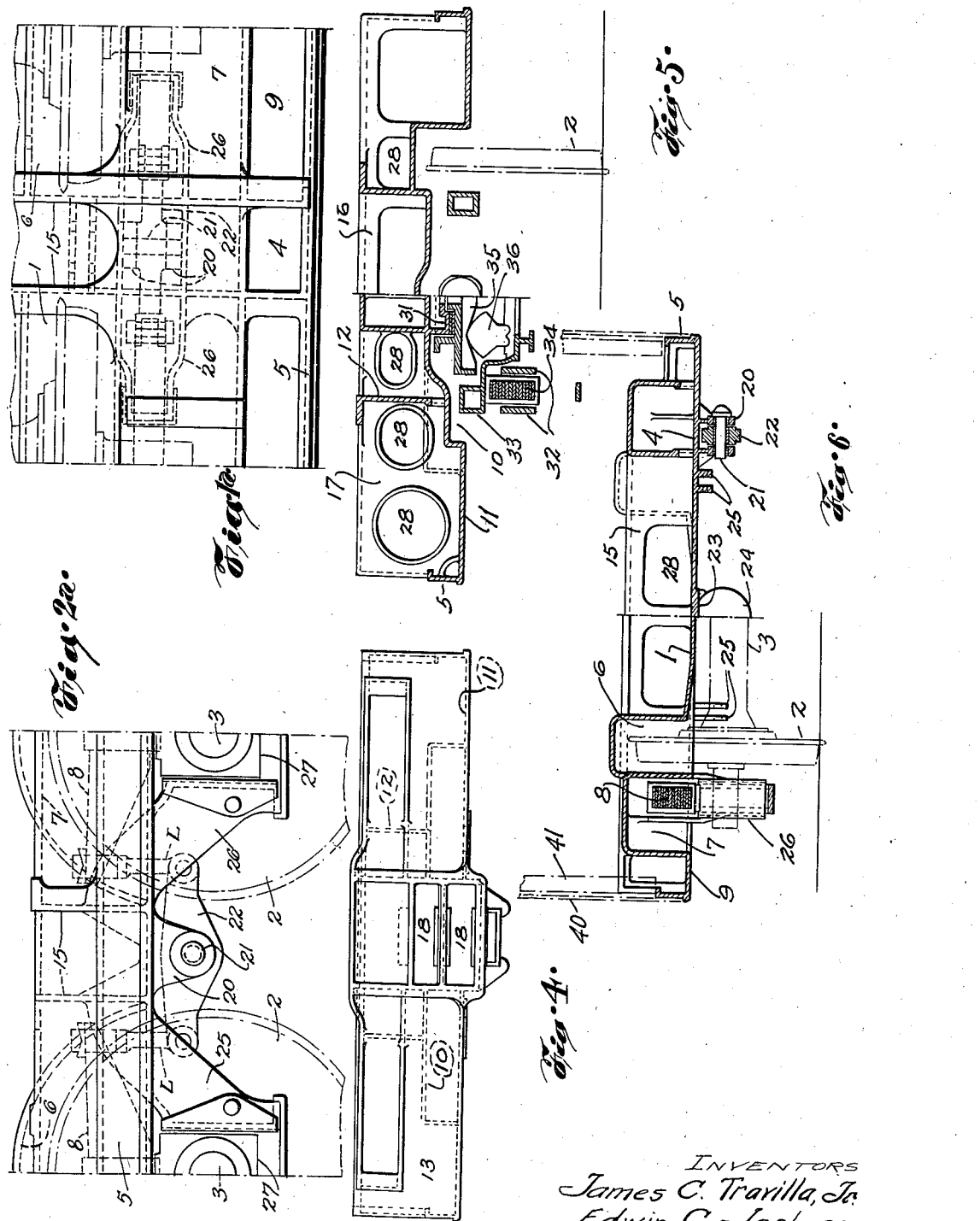
INVENTORS
James C. Travilla, Jr.
Edwin C. Jackson
BY Rodney Bedell
ATTORNEY March 3, 1942. J. C. TRAVILLA, JR., ET AL 2,274,757
LOCOMOTIVE TENDER
Filed Feb. 21, 1938 7 Sheets-Sheet 3
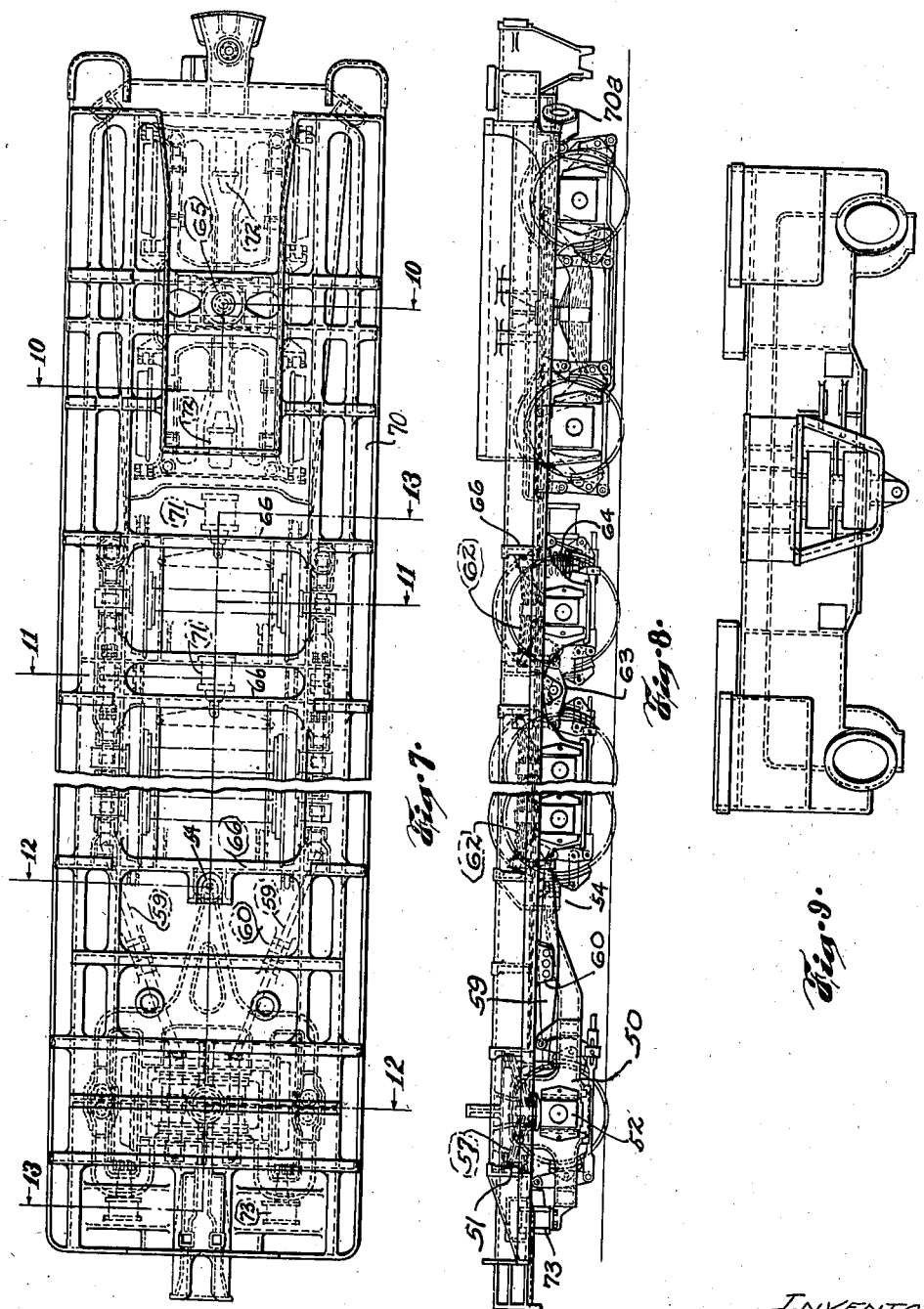

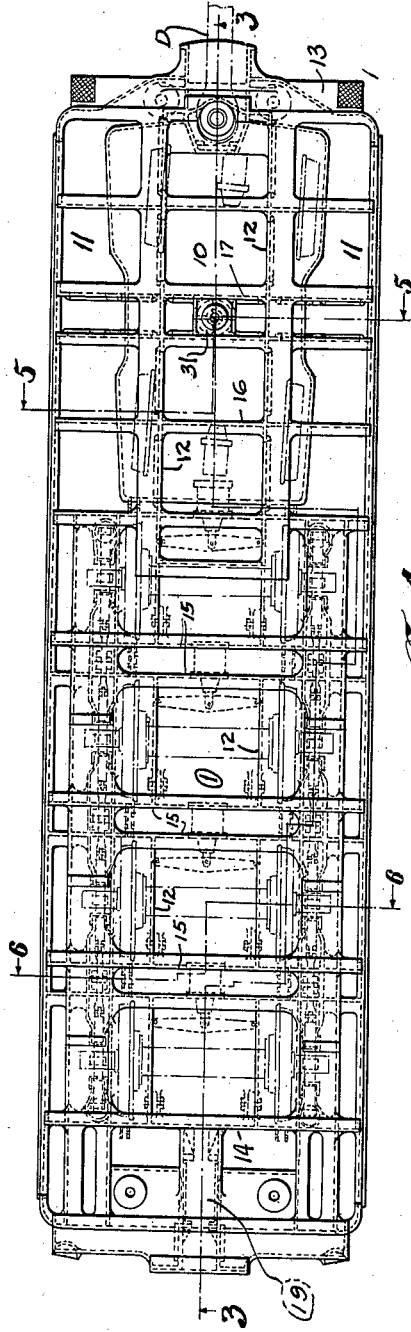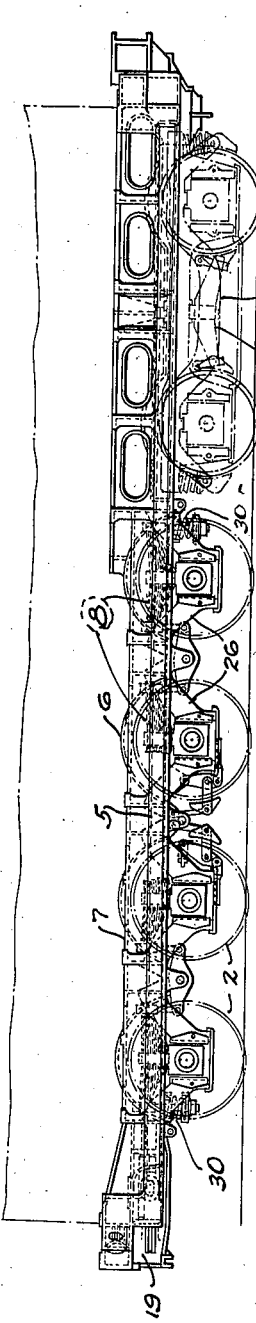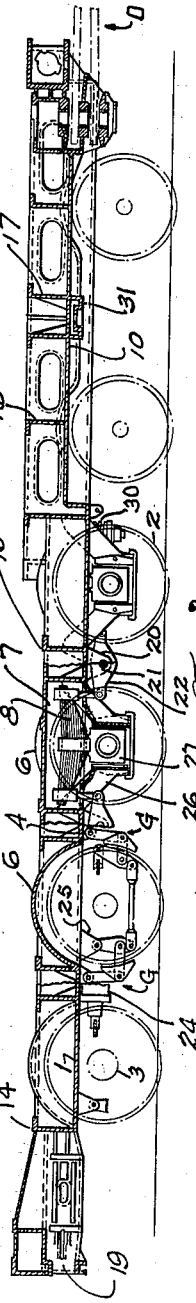

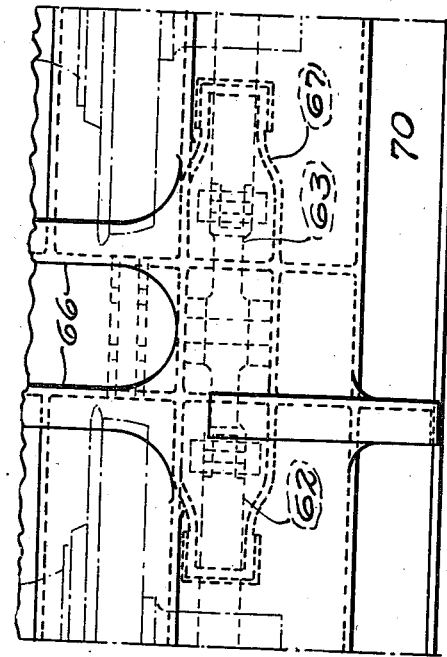
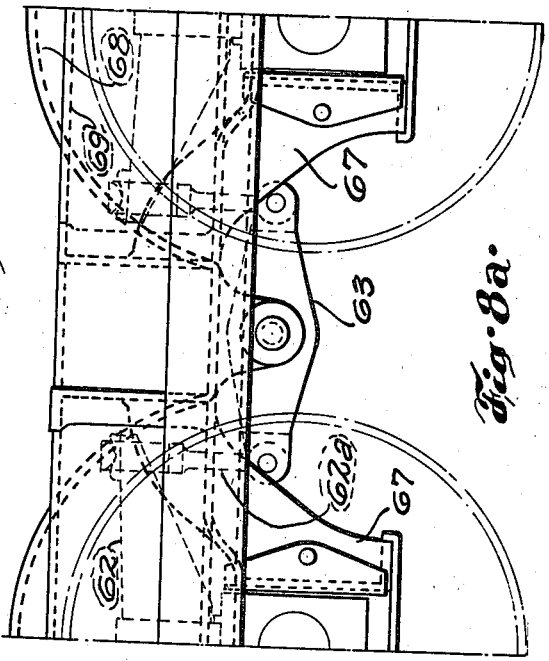
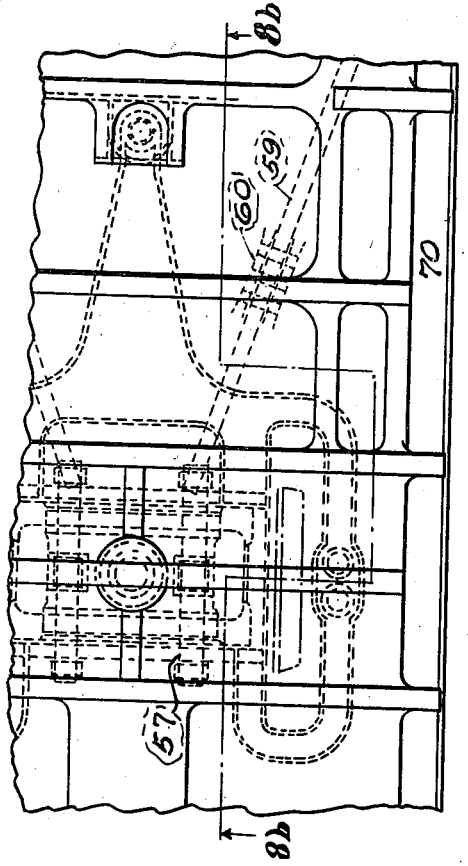
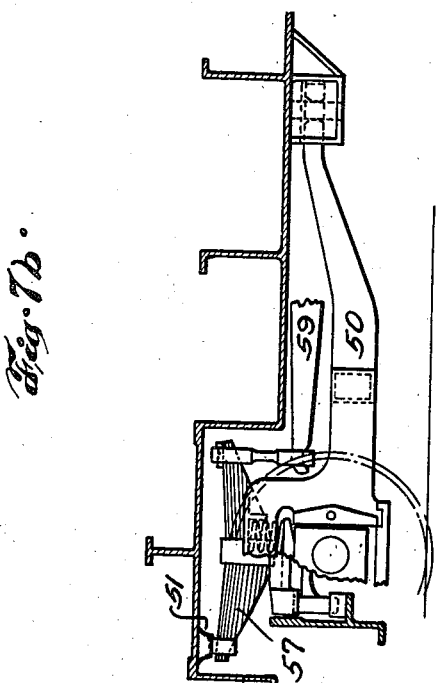
INVENTORS
James C. Travilla, Jr.
Edwin C. Jackson
BY Rodney Bedell
ATTORNEY March 3, 1942.  J. C. TRAVILLA, JR., ET AL  2,274,757
LOCOMOTIVE TENDER
Filed Feb. 21, 1938  7 Sheets-Sheet 5

INVENTORS
James C. Travilla, Jr.
Edwin C. Jackson
BY Rodney Bedell
ATTORNEY

March 3, 1942.  J. C. TRAVILLA, JR., ET AL  2,274,757
LOCOMOTIVE TENDER
Filed Feb. 21, 1938  7 Sheets-Sheet 6

INVENTORS
James C. Travilla, Jr.
Edwin C. Jackson
BY Rodney Bedell
ATTORNEY

March 3, 1942.   J. C. TRAVILLA, JR., ET AL   2,274,757
LOCOMOTIVE TENDER
Filed Feb. 21, 1938   7 Sheets-Sheet 7

INVENTORS
James C. Travilla
Edwin C. Jackson
BY Rodney Bedell
ATTORNEY

Patented Mar. 3, 1942

2,274,757

UNITED STATES PATENT OFFICE 2,274,757

LOCOMOTIVE TENDER

James C. Travilla, Jr., University City, and Edwin C. Jackson, Clayton, Mo., assignors to General Steel Castings Corporation, Granite City, Ill., a corporation of Delaware Application February 21, 1938, Serial No. 191,674

24 Claims. (Cl. 105—231)

The invention relates to railway rolling stock and more particularly to locomotive tenders and consists primarily in the construction of tender underframe and running gear which facilitate increasing the capacity of the tender without incurring disadvantages inherent in the usual designs of increased capacity tenders. The usual high capacity tender has six-wheel trucks and it has been found that the high wheel loads are a source of trouble in maintenance. Also, in increased tender capacity it has been necessary to lengthen the tenders, which is undesirable due to the fact that engine and tender length is limited by lengths of turntables.

In an effort to meet the demand for tenders of greater capacity and keep the wheel loads within safe limits, it has been found necessary in some instances to provide an eight-wheel truck under each end of the tender but this is undesirable because it increases the length and weight of the tender.

Another difficulty encountered with eight-wheel swivel trucks is the increased overhang of the body at the end of the tender which on curved track results in increased displacement of the end of the tender and the coupler mounted thereon laterally from the center line of the track, which increases the difficulty of maintaining a satisfactory arrangement for coupling the tender to the first car of the train.

One of the main objects of the present invention is to overcome the difficulties indicated above.

Another main object of the invention is to increase the capacity of the tender without increasing the weight and overall length proportionately. The lighter weight is accomplished by more advantageous disposition of the supports beneath the tank, the supports consisting of equalizers and springs located and distributed substantially throughout the major portion of the tender instead of supporting the tender on the usual six-wheel trucks through their center plates and side bearings at the end portions of the tender only, and also by providing a water carrying space in the space previously occupied by a large portion of the six-wheel truck frames.

Another object of the invention is to improve the stability of the tender, and this is accomplished by lowering its center of gravity and by an improved equalizing system providing what is substantially a three-point support of the tank on the running gear. The three-point support is accomplished by utilizing a center bearing truck at one end portion of the tender and spring riggings anchored to the remaining portion of the tender but spaced outwardly from the longitudinal center line thereof, the truck forming one point of support and each spring rigging forming one of the other points of support.

Another object of the invention is to provide a spring rigging which has a greater flexibility than the spring rigging of the usual six-wheel trucks, which is made possible by spacing the wheels far enough apart to permit application of long springs with suitable length of equalizers between them.

Another object of the invention is to render the load-supporting springs more accessible for inspection and for individual removal than is usual in conventional tender trucks.

Another object of the invention is to simplify and make more effective the braking arrangement, and this is accomplished by providing individual cylinders for respective pairs of wheels.

Another object is to provide for an increase in the life of the wheels and the track by using larger diameter wheels. At the same time it is desired to have a lower center of gravity of the tender than is possible with the ordinary truck.

These and other detailed objects of the invention are attained by the structures illustrated in the accompanying drawings, in which—

Figure 1 is a top view of a tender underframe or tank frame, the portions of the running gear being indicated in broken lines.

Figure 1a is a detailed top view of a portion of the bolster and adjacent parts shown in Figure 1 but is drawn to an enlarged scale.

Figure 2 is a side elevation of the structure shown in Figure 1.

Figure 2a is a side elevation of the structure shown in Figure 1a and corresponds to a portion of Figure 2 but is drawn to an enlarged scale.

Figure 3 is a longitudinal section taken approximately on the line 3—3 of Figure 1.

Figure 4 is a front elevation of the tender frame.

Figures 5 and 6 are vertical transverse sections taken on the lines 5—5 and 6—6 of Figure 1.

Figure 7 is a top view corresponding generally to Figure 1 but illustrating another structure, a portion of which is broken away to make possible illustration on a larger scale.

Figure 7a is a detailed top view of a portion of an intermediate transom structure and adjacent parts of the construction shown in Figure 7 but is drawn to an enlarged scale.

Figure 7b is a similar detailed top view of the rear portion of the construction shown in Figure 7.

Figure 8 is a side elevation of the structure shown in Figure 7.

Figure 8a is a side view of the structure shown in Figure 7a.

Figure 8b is a longitudinal vertical section taken on the line 8b—8b of Figure 7b.

Figure 9 is a front elevation of the same.

Figures 10, 11, 12 and 13 are vertical transverse sections taken on the corresponding section lines of Figure 7.

Figure 10:
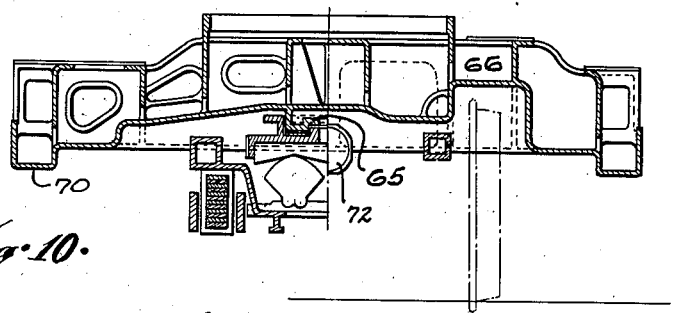
Figure 11:
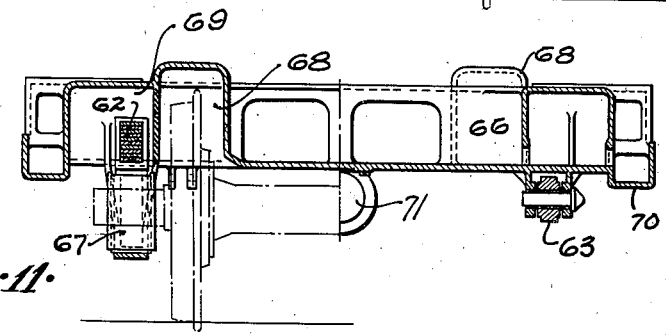
Figure 12:
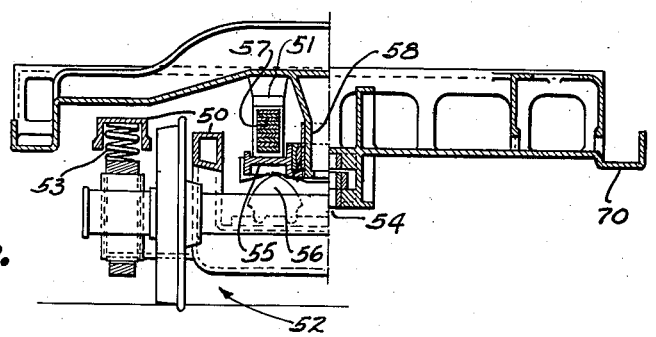
Figure 13:
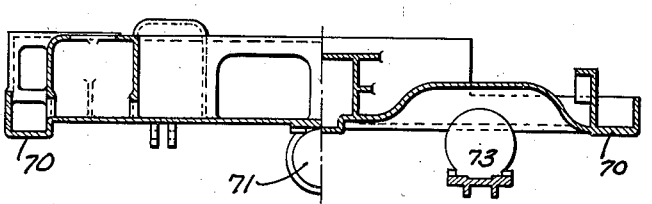
Figure 14:
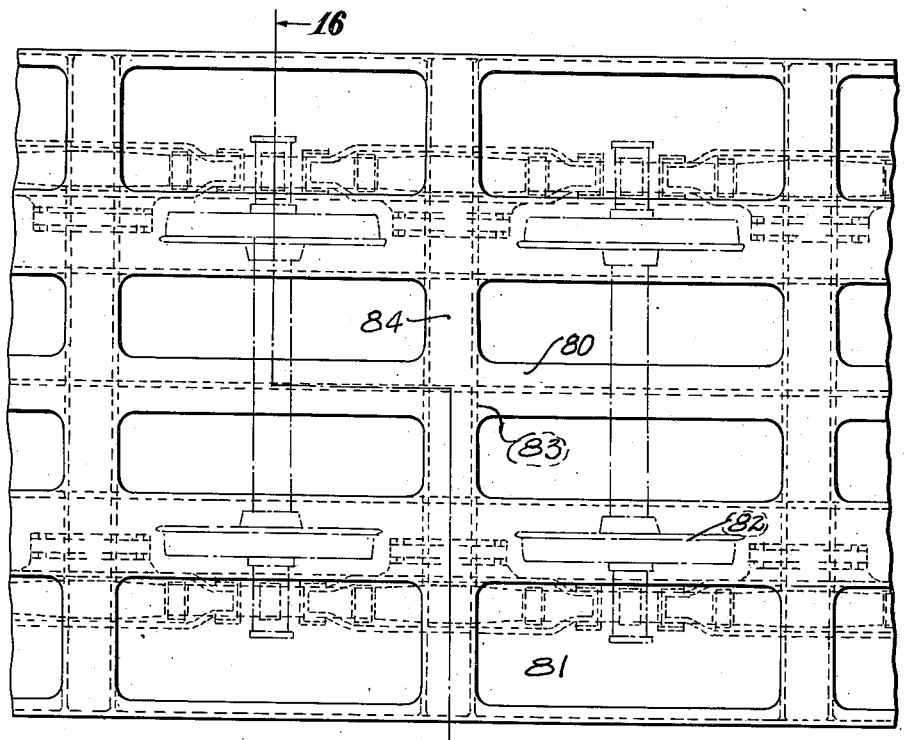

Figure 14 is a top view of a portion of a tender frame embodying another form of the invention.

Figure 15:
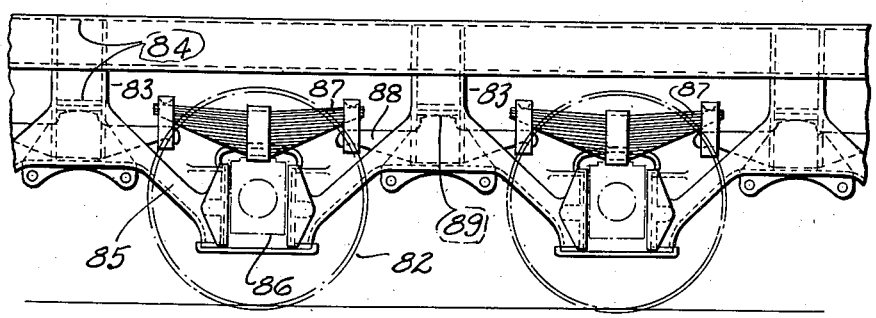

Figure 15 is a side elevation of the same.

Figure 16:
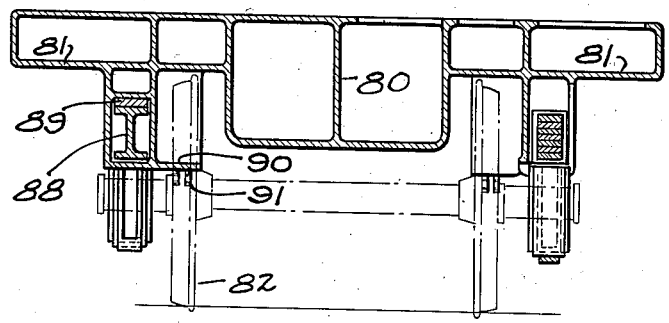

Figure 16 is a vertical transverse section taken on the line 16—16 of Figure 14.

Figure 17:
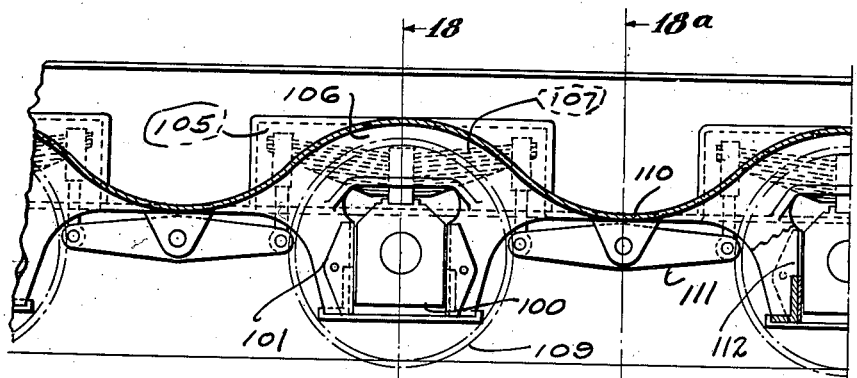
Figure 18:
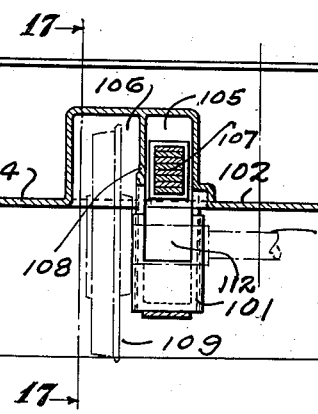

Figure 17 is a longitudinal section through a portion of a tender embodying another form of the invention and is taken on the line 17—17 of Figure 18.

Figure 18 is a transverse section through the tender of Figure 17, the lefthand portion being taken on the line 18—18 and the righthand portion being taken on the line 18a—18a of Figure 17.

In the structure illustrated in Figures 1 to 6, inclusive, the tender frame preferably comprises a single casting having a generally horizontally disposed web forming the bottom of the tender tank and merging with platform elements for mounting the stoker compartment walls and stoker mechanism (not shown). This frame is supported upon a four-wheel swiveling lateral motion truck, positioned beneath its forward end and upon eight wheels with axles mounted in the frame rearwardly of the truck.

Throughout a substantial portion of the length of the tender the bottom web, as shown at 1, extends between opposing wheels 2 at a level slightly above the axles 3. Restricted portions 4 of this web extend at the same level between adjacent wheels and outwardly to the sides of the frame and cooperate with vertical webs 5 to form the side sills of the frame. The bottom web is recessed upwardly at 6 and 7 to accommodate wheels 2 and springs 8 respectively, and exteriorly of these recesses the web again drops at 9 to the lower level, thereby increasing the water capacity of the tender tank and maintaining a substantially uniform side sill section throughout the length of the tender. The central forward portion 10 of the bottom web is recessed upwardly to accommodate the adjacent portions of the swiveling truck, but the forward side portions 11 of the web are at substantially the same level as portions 1, 4 and 9.

Vertical longitudinal webs 12 extend inwardly from front end sill 13 and constitute widely spaced sills which reinforce the front portion of the frame and form suitable supports for the stoker compartment walls (not shown). Transverse vertical webs 14, 15, 16 and 17 constitute the transverse transoms of the frame. These members are flanged along their upper edges and merge with the bottom web along their lower edges, and are lightened by suitable openings 28.

The front portion of the tender includes suitable elements arranged in box-like formation to form one or more pockets 18 (Fig. 4) for receiving a drawbar D (Fig. 1) of any approved construction whereby the tender is connected to the locomotive (not shown). The rear of the tender underframe includes suitable elements forming a pocket 19 (Fig. 3) for mounting a draft gear (not shown) of any desired construction whereby the tender is coupled to the adjacent car.

Intermediate the successive recesses 7 are depending brackets 20 (Fig. 2a) forming bearings for pins 21 on which equalizers 22 are pivoted. The ends of the equalizers are connected to the ends of springs 8 by the links L. Pads 23 (Fig. 6) are provided at intervals for attaching air brake cylinders 24, and lugs 25 also depend from the bottom web of the underframe to support the brake hangers, levers, etc., comprising the brake gear indicated generally at G (Fig. 3).

The arrangement of the brake gear forms the subject matter of a continuing application filed by the present applicants March 17, 1941, Serial No. 383,672.

Depending from the ends of each spring receiving recess 7 are downwardly inclined members 26 (Fig. 2a) comprising pedestal legs slidably receiving between them the axle journal boxes 27.

All the springs 8 and equalizers 20 near one side of the tender constitute a single equalizing system with its ends yieldingly anchored to the underframe by coiled springs 30. The forward truck supports the corresponding portion of the underframe through its pivotal center plate connection to the body center plate 31 and preferably, but not necessarily, the forward truck includes equalizer bars 32 and a frame 33 yieldingly supported upon the bars by springs 34 and carrying a lateral motion bolster 35 by means of rockers 36, all comprising a well known swiveling lateral motion truck construction.

Riveted or welded to underframe side sill element 5 are superstructure plates 40 suitably reinforced by structural steel members 41 and all cooperating with the side sills to form side girders extending from end to end of the tender. Transoms 14, 15, 16 and 17 carry the load on the central portion of the tank transversely of the car to these side girders. The longitudinal forces are carried through the underframe structure.

The major portion of the tender body and load is supported at a plurality of points on each side of the longitudinal center line. The yielding nature of the supporting structure and the independent equalization of the same near opposite sides of the tender cooperate with the central support at the forward truck to provide a substantially three-point support for the tender, thus increasing its stability and making for easy riding qualities.

The supporting of the major portion of the tender upon the spring systems near the side portions of the underframe avoids the objections previously referred to as attending the use of large swiveling trucks under each end, while providing for increased capacity to an extent equaling or exceeding that provided by such trucks.

Figures 7 to 13 illustrate another form of the invention in which even greater capacity may be provided. This tender comprises a forward four-wheel pivoted truck, supporting the forward portion of the tender, and a plurality of wheels and axles mounted in pedestals depending from the underframe and supporting the major portion of the tender load at the rear of the front pivoted truck, as described above. The tender includes, in addition, the supporting of the rear portion of the tender upon a two-wheel truck of the radial type. The radial truck frame 50 is supported by a pair of wheels through axle boxes 52 and springs 53 and the truck frame extends forwardly and inwardly from its wheels and is pivoted to the tender underframe at 54. A lateral motion bolster 55, carried on rockers 56 mounted on truck frame 50, supports a pair of semi-elliptic springs 57 located on opposite sides of a large diameter center pin structure 58 depending from the upwardly recessed bottom of the tender frame and fitting in an opening in the bolster.

The rear ends of springs 57 support the tender frame through bearings 51 and their forward ends support the rear ends of diagonally disposed equalizers 59, pivotally connected to lugs 60 projecting from the bottom of the tender frame, and having their forward ends connected to the rear ends of laterally spaced support systems each comprising a plurality of springs 62 (Figs. 7, 7a) with links 62a suspending equalizers 63. The forward equalizers 63 are yieldingly anchored to the frame by coiled springs 64 as in the structure previously described. When the tender rides over curved track and its rear portion swings laterally from the center line of the track, the radial truck follows the track and the lateral motion of its bolster 55 accommodates the relative lateral movement of the tender frame and body.

Hence the equalized spring suspensions near the sides are continuous from near the forward truck to the rear end of springs 57 on the radial truck and these spring suspensions cooperate with the support of the forward portion of the tender through center plate 65 to form what is substantially a three-point support of the tender although a swivel truck is provided at one end and a radial truck at the other end to accommodate travel of a tender over curved track.

The general construction of the tender frame resembles that previously described and particularly in including transverse members 66 carrying the load to the side sill and girder structure as referred to above. As in the previously described structure, pedestal legs 67 depend from the frame at the ends of cross members 66 and the web forming the bottom wall of the tank is suitably recessed at 68 and 69 to accommodate the wheels and springs which are mounted in the underframe and the web includes a portion 70 at the side of the tender which is located substantially at the level of the major portion of the tank bottom but may be depressed to form a trough sloping toward the discharge oulet 70a at the front end of the tender. The underframe mounts the brake cylinders 71 for the brake gear of the wheels mounted in the underframe and each of the end trucks mounts the brake cylinders 72 and 73, respectively, for its own brake gears. Three wheeled axles are shown in Figures 7 and 8 but additional axles and wheels may be included in the intermediate portion of the tender according to capacity desired.

Figures 14, 15 and 16 illustrate a form of the invention in which the underframe includes a center sill 80 of I-section and the side portions 81 of the tank bottom wall remain at a level above the tops of the wheels 82. Transverse vertical webs 83 are associated with corresponding horizontal webs 84 and form box-shaped cross members extending between the side sills 84a. Diagonal members 85 extend downwardly from the end portions of transoms 83—84 and terminate in pedestal guides for the axle boxes 86 which carry springs 87 supporting equalizers 88. The equalizers are partially housed by webs connecting adjacent members 85 and by the adjacent portions of the cross members 83—84 and the equalizers are pivoted on pads 89 provided on the bottoms of the cross members. Brackets 90 project inwardly from the intermediate pedestal structure and have integral brake hanger lugs 91. The brake system will include one or more cylinders carried on the frame at each side of the same and operating the brakes on that side of the tender.

Figures 17 and 18 illustrate a form of the invention in which the axle boxes 100 and the pedestals 101 therefor are located between the wheels 109. The portion 102 of the tank bottom forming web, between opposite wheels, is at a level just above the axles 103 and the portion 104 on the outside of the wheels is at the same level as the central portion. The recesses or pockets 105 and 106, between bottom portions 102 and 104, accommodate the springs 107 and wheels 109, respectively, and these portions of the frame are reinforced by longitudinal vertical webs 108. Intermediate successive pockets, the bottom web is continuous throughout the width of the underframe, as indicated at 110.

In this tender there are two sets of springs 107 and equalizer bars 111 spaced from each other and from the center line of the tender although located closer to the center line than to the sides of the tender. Each set of springs and equalizers forms a continuous equalizing system which is anchored at its ends to the tender frame similarly to the equalizing arrangements previously described.

In each form of the invention the tender is provided with a swivel truck near its forward end and at the rear of this swivel truck is a plurality of wheels and axles mounted in the underframe and carrying the major portion of the tender load with the wheels and axles distributed substantially throughout the major portion of the tender and supporting the tender underframe at spaced points, thus permitting the use of lighter construction than possible in one which must extend between swiveling trucks only located as close to the ends of the tender as possible to avoid undesirable overhang.

In each form of the invention the tank forming bottom member is at a low level throughout the length of the wheel and axle mounting portion and may be elevated over the swivel truck at the forward end and preferably is located at the same low level outside of all of the truck wheels. Hence there is a high ratio of capacity to dead weight and to the length of the tender and also there is provided a low center of gravity.

Each spring equalizing system comprises essentially a three-point support for the tender, improves the stability and easy riding qualities. In most of the forms described, the main supporting springs may be removed laterally from the pedestals and below the side sills and hence are more accessible for inspection and repair than the springs in swivel trucks in which, usually, the tender body must be lifted from the trucks to get at the springs although in some types of truck there is provision for removing the springs through the ends of the truck frames, but to remove center springs in this manner may necessitate the removal of end springs although the latter may be in satisfactory condition. With the arrangement illustrated in Figures 17 and 18, the spring 107 cannot be passed outwardly beneath the web 108 (because of the pedestal structure immediately below the spring) as in the other forms illustrated, but upon dropping of the wheel and axle and removal of the pedestal wear plate, one end of spring 107 may be dropped and passed lengthwise of the truck through the pedestal leg which is slotted for this purpose as indicated at 112.

Individual brakes may be provided for each pair of wheels mounted in the underframe or, if desired, an interconnected brake gear may be provided for each set of wheels on the same side of the tender. The loads are carried directly by the cross beams and side girders to the equalizers throughout the length of that portion of the underframe which mounts the wheels and axles and to the center plate structure in the swivel truck.

It will be obvious to those skilled in the art that the structure may be modified substantially from the disclosures made herein, and that many of the features may be incorporated in tender structures without necessarily using the other features, all of which contribute, however, to the main objectives stated above. The exclusive use of all such modifications as come within the scope of the claims is contemplated.

What is claimed is:

1. In a locomotive tender, an underframe having depending pedestals, wheels and axles with journal boxes mounted in said pedestals, the underframe forming a tank bottom having a horizontal portion extending the full width of the tender at a substantial distance below the level of the tops of said wheels.

2. A locomotive tender as described in claim 1 in which a truck is pivoted to and supports an end portion of the tender.

3. In a railway locomotive tender, a frame having a horizontally disposed web forming the bottom of the tender tank from side to side of the tender, there being pedestals depending from said web, wheels, axles and journal boxes mounted in said pedestals, portions of said web extending over said wheels towards the sides of the tender and beyond the vertical planes of said wheels and being there depressed to a level a substantial distance below the level of the tops of said wheels and forming the bottom of a water-receiving compartment of the tank abreast of said wheels.

4. In a railway locomotive tender, a frame having a horizontally disposed web forming the bottom of the tender tank from side to side of the tender, there being pedestals depending from said web, wheels, axles and journal boxes mounted in said pedestals substantially all of said web between said wheels at opposite sides of the tender being located a substantial distance at a level below the tops of said wheels, and portions of said web between adjacent wheels at the sides of the tender extending at said level towards the sides of the tender and beyond the vertical planes of the adjacent wheels, other portions of said web extending upwardly, outwardly and downwardly over said wheels and then outwardly towards the sides of the tender at said level and cooperating with said first-mentioned portions to form the bottom of a water-receiving compartment of the tank extending alongside of and between said wheels.

5. In a railway locomotive tender, a frame having a horizontally disposed web forming the bottom of the tender tank from side to side of the tender, there being members depending from said web and forming pedestals, wheels, axles and journal boxes therefor mounted in said pedestals, said pedestals being located between said wheels at opposite sides of the tender, and said tank bottom forming web extending towards the sides of the tender between successive wheels and axle boxes at a level located a substantial distance below the tops of said wheels.

6. In a railway locomotive tender, an underframe including side elements, body side plates secured to said elements and cooperating therewith to form body side girders, wheels, axles therefor, journal boxes on the ends of said axles outwardly of said wheels from the center of the tender, pedestals on said underframe receiving said journal boxes, springs and equalizers mounted on said journal boxes and supporting said underframe, said underframe including members extending from side to side of the underframe and transmitting the body load to said equalizers and side girders.

7. In a railway locomotive tender, an underframe having pedestals, wheels, axles, journal boxes on said axles slidable in said pedestals, said underframe having members extending from side to side of the tender and comprising upright webs with their lower elements positioned a substantial distance below the level of the tops of said wheels, said underframe also including a horizontally disposed web extending from side to side of the tender and between the lower elements of said transverse members and forming the bottom of the tender tank and provided with upwardly extending recesses of restricted area between said members to accommodate said wheels.

8. In a locomotive tender, an underframe having depending pedestals, wheels and axles with journal boxes mounted in said pedestals, the underframe forming a tank bottom wall extending substantially horizontally a substantial distance below the level of the tops of said wheels and extending laterally of the tender beyond said wheels, and being recessed upwardly to accommodate said wheels.

9. In a locomotive tender, an underframe having depending pedestals, wheels and axles with journal boxes mounted in said pedestals, said pedestals and journal boxes being positioned between the wheels and the adjacent sides of the tender, there being springs supporting said underframe on said boxes, the underframe forming a tank bottom wall extending substantially horizontally a substantial distance below the level of the tops of said springs and extending laterally of the tender beyond said springs and said underframe being recessed upwardly to accommodate said springs.

10. In a locomotive tender, an underframe having depending pedestals, wheels and axles with journal boxes mounted in said pedestals, there being springs supporting said underframe on said boxes, the underframe forming a tank bottom wall extending substantially horizontally a substantial distance below the level of the tops of said springs and below the level of the tops of said wheels and extending laterally of the tender beyond said springs and wheels and being recessed upwardly to accommodate said springs and wheels.

11. A railway locomotive tender frame member forming the bottom of the tender tank and having a low level central portion, there being upwardly extending wheel-receiving recesses at the sides of said central portion and depending axle box pedestal legs at the outer side of said wheel-receiving recesses and spaced from said central portion, said member including tank bottom forming parts located outwardly of said pedestal legs and at a level below the upper portions of said legs, there being upwardly extending recesses in said member positioned inwardly of said latter-mentioned parts and outwardly of said wheel-receiving recesses and spaced from each other longitudinally of the member and arranged to accommodate body supporting springs carried on said boxes.

12. In a locomotive tender, an underframe having depending pedestals, wheels and axles with journal boxes mounted in said pedestals, the underframe forming a tank bottom wall extending substantially horizontally a substantial distance below the level of the tops of said wheels and extending at said level laterally of the tender between adjacent wheels on the same side of the tender.

13. In a railway locomotive tender, an underframe having a transverse web forming the bottom wall of the tender tank, journal box receiving pedestals depending from said web, portions of said web between successive pedestals being located a substantial distance below the level of the tops of wheels mounted on the axles journalled in said pedestals, said portions extending outwardly beyond said wheels, said web being recessed upwardly between said portions to accommodate said wheels.

14. In a railway locomotive tender, a body frame including side sill elements and a tank bottom web extending between the lower portions of said elements, tank body side plates secured to said elements and cooperating therewith to form body side girders, said frame having pedestals for journaling wheeled axles, and said frame including members with vertical webs of substantial depth extending from side sill to side sill above said bottom web and between successive pedestals for transmitting the load to said girders.

15. In a railway locomotive tender, a body frame including side sill elements and a horizontal web between the lower parts of said elements and forming the bottom of the tender tank, body side plates secured to said sill elements and cooperating therewith to form body side girders, said frame having pedestals for outside journal boxes spaced inwardly of the tender from said sill elements, said frame including transverse members with vertical webs extending from side to side of the tender above said web and united with said elements, wheeled axles and outside boxes received in said pedestals, springs supported by said boxes, and equalizers connecting said springs and pivoted to the end portions of said members for supporting the tender body.

16. In a railway locomotive tender, a frame including side sills and transverse transom members extending from side sill to side sill and having a horizontally disposed web forming the bottom of the tender tank and at the level of the lower portions of said members, side girder structures including said side sills as lower chords, wheels and axles, pedestals on said frame outwardly of said wheels from the center of the tender, journal boxes for said axles received in said pedestals and supporting said frame at points adjacent to said girder structures.

17. In a railway locomotive tender, a frame forming a bottom wall of the tender tank and including side sills and transverse transoms extending from side sill to side sill, members inclined downwardly from the end portions of successive transverse transoms and converging towards each other and terminating in axle box guides, and wheeled axles with journal boxes mounted in said guides, there being lateral openings in said frame above said members and boxes, and elements carried by said boxes and supporting said frame and being removable laterally of the tender over said members and guides.

18. In a locomotive tender, an underframe having depending pedestals, wheels and axles with journal boxes mounted in said pedestals, the underframe forming a tank bottom extending in part approximately the full width of the tender below the level of the tops of said wheels, there being spaced trucks pivotally secured to and supporting the end portions of the underframe.

19. In a railway locomotive tender, a body having a center bearing near one end portion, a truck supporting said body through said bearing, there being a series of pedestals on each side of the longitudinal center line of said body extending a substantial distance along the intermediate portions of said body, a truck near the other end portion of the tender and including a bolster and body supporting springs mounted directly on said bolster and located below said body and spaced from the center line of the truck, wheels and axles journaled in said pedestals, springs supported by said axles, and a rigid body supporting equalizing system for all of said springs on each side of said center line, the ends of each of said systems being independently anchored to said body, and said body including tank structure extending downwardly below the level of said springs and the tops of said wheels.

20. In a railway locomotive tender, a rigid body having a center bearing near one end portion, a truck swiveling relative to said body supporting said body through said bearing, there being a series of pedestals on each side of the longitudinal center line of said body extending a substantial distance along the intermediate portions of said body, a truck movable laterally relative to said body and including a lateral motion bolster and springs directly carried thereby and located below said body and supporting the other end portion of said body at points spaced from the longitudinal center line of the tender, wheeled axles journaled in said pedestals, springs supported by said axles, and a body supporting equalizing system for all of said springs on each side of said center line, the ends of each of said systems being independently anchored to said body.

21. In a railway locomotive tender, a tank body with an underframe including an imperforate web forming a water-retaining bottom wall of the tender tank and provided with a center bearing near one end portion, a truck supporting said body through said bearing, there being a series of pedestals on each side of the longitudinal center line of said body extending a substantial distance along the intermediate portions of said body, a radial truck frame beneath the other end portion of said body and carrying a lateral motion bolster having a pivotal connection to said body, said truck frame being pivotally connected to said body at a point adjacent the nearest of said pedestals, springs on said bolster below said web and adjacent said bolster connections, wheeled axles journaled in said pedestals, springs and equalizers supporting said body from said axles, and equalizers pivoted to said body and connecting said pedestal axle springs and equalizers with said radial truck springs.

22. A structure as described in claim 1 in which the springs and equalizers on the pedestal mounted axles at one side of the longitudinal center line of the tender and the associated radial truck spring and connecting equalizer are anchored to the tender body independently of the corresponding elements on the opposite sides of said center line.

23. In a railway locomotive tender, a body frame including an imperforate web forming a tank bottom, a center bearing truck supporting one end portion of said frame, a laterally swinging truck supporting the other end portion of said frame through laterally spaced springs located below said web, pedestals on said frame between said trucks and on each side of its longitudinal center line, wheeled axles journaled in said pedestals, springs supporting said frame from said axles, all of said latter mentioned springs on one side of said center line being equalized with each other and with the corresponding spring on said latter mentioned truck.

24. In a railway locomotive tender, trucks supporting spaced portions respectively of the tender body, wheeled axles journalled in said body between said trucks, individual body supporting springs carried on one of said trucks and on said wheeled axles and located beneath said body at opposite sides of the longitudinal center line of the tender, the body supporting springs on said axles at one side of said center line and the body supporting spring carried on said truck on the same side of the center line being interconnected to form an equalizing system acting to provide proper distribution of the weight of the tender body and its load to said wheeled axles and to the truck carrying said body supporting spring.

JAMES C. TRAVILLA, Jr.
EDWIN C. JACKSON.